(12) United States Patent
Ngo

(10) Patent No.: US 7,978,825 B2
(45) Date of Patent: Jul. 12, 2011

(54) ANATOMICAL MARKER FOR X-RAY ORIENTATION

(75) Inventor: Peter D. Ngo, West Newton, MA (US)

(73) Assignee: MDX Laboratories, LLC, West Newton, MA (US)

( * ) Notice: Subject to any disclaimer, the term of this patent is extended or adjusted under 35 U.S.C. 154(b) by 174 days.

(21) Appl. No.: 12/250,164

(22) Filed: Oct. 13, 2008

(65) Prior Publication Data

US 2010/0091951 A1   Apr. 15, 2010

(51) Int. Cl.
  *H05G 1/28* (2006.01)
(52) U.S. Cl. .......................... 378/165; 378/163
(58) Field of Classification Search .............. 378/162, 378/163, 165, 166, 175, 177, 189, 18
  See application file for complete search history.

(56) References Cited

U.S. PATENT DOCUMENTS

| | | | |
|---|---|---|---|
| 1,576,781 A | 3/1926 | Phillips | |
| 3,010,223 A * | 11/1961 | Alderson | 434/267 |
| 4,274,006 A | 6/1981 | Caine | |
| 4,506,676 A | 3/1985 | Duska | |
| 5,052,035 A | 9/1991 | Krupnick | |
| 5,077,778 A | 12/1991 | Fabian | |
| 5,193,106 A | 3/1993 | DeSena | |
| 5,394,456 A | 2/1995 | Livingston | |
| 5,469,847 A | 11/1995 | Zinreich | |
| 5,592,527 A | 1/1997 | Ray | |
| 5,640,438 A | 6/1997 | Talluto | |
| 5,657,366 A * | 8/1997 | Nakayama | 378/165 |
| 6,160,870 A | 12/2000 | Jacobson | |
| 6,354,737 B1 | 3/2002 | Hufe et al. | |
| 6,356,621 B1 | 3/2002 | Furumori | |
| 6,470,207 B1 | 10/2002 | Simon et al. | |
| 7,092,492 B2 | 8/2006 | Marn | |
| 7,123,690 B1 | 10/2006 | Brown et al. | |
| 7,313,430 B2 | 12/2007 | Urqhart et al. | |
| 2004/0052333 A1* | 3/2004 | Sayre et al. | 378/163 |
| 2004/0081284 A1 | 4/2004 | Livingston | |
| 2005/0000133 A1 | 1/2005 | Russell | |
| 2005/0157847 A1 | 7/2005 | Marn | |
| 2006/0065273 A1 | 3/2006 | Lewis | |
| 2007/0140413 A1* | 6/2007 | Saracen | 378/18 |

FOREIGN PATENT DOCUMENTS

| | | |
|---|---|---|
| JP | 2004-254933 A | 9/2004 |
| WO | WO96/25111 A1 | 8/1996 |
| WO | WO2005/018288 A1 | 2/2005 |
| WO | WO2006/036248 A1 | 4/2006 |
| WO | PCT/US2009/060559 | 4/2010 |

OTHER PUBLICATIONS

Techno Aide, Inc. "Techno-Aide Online Catalog." Mar. 24, 2008. 70-81. Available at <http://www.techno-aide.com/p/fullpage.php-?page=070>.

* cited by examiner

*Primary Examiner* — Hoon Song
(74) *Attorney, Agent, or Firm* — Aexius LLC; Michael A. Long, Esq.

(57) ABSTRACT

A radiopaque marker for more effectively orienting a fluoroscopy image to a patient's body position is disclosed. A method for orienting a radiological image with a patient's anatomical position comprises the step of forming a marker with a first side indicator and a second side indicator formed substantially opposite the first side indicator. A device in accordance with the present invention comprises a radiopaque marker comprising a first side indicator, a second side indicator, and a humanoid shape.

47 Claims, 11 Drawing Sheets

ANATOMICAL MARKER FOR X-RAY ORIENTATION

BACKGROUND OF THE INVENTION

1. Field of the Invention

The present invention relates in general to markers used in radiology, and in particular to an anatomical marker used to orient to a patient's anatomical position in x-ray and fluoroscopy procedures.

2. Description of the Related Art

Markers are often used to identify a body part shown in an x-ray image. X-rays which are absorbed by markers do not appear on x-ray sensitive media. In fluoroscopy, real-time x-ray images are displayed on a video monitor. Fluoroscopy is often combined with other medical procedures.

Paramount to fluoroscopy is initially orienting the x-ray image to the patient's body position. One problem is that images must be oriented in left-right, cranio-caudal, and antero-posterior position before a procedure can begin. Although bony landmarks are often used to orient the patient's body position with the image, fluoroscopy images typically do not include the entirety of a patient's body. As a result, it is difficult to ascertain the body position of a patient in a given fluoroscopy image. Also, given the axial symmetry of bony landmarks in x-ray, it is difficult to quickly, clearly, and confidently delineate left, right, and cranio-caudal positions. Practitioners must adjust the image repeatedly until the patient's body position and the x-ray image are properly correlated. The image can be rotated and reversed, typically on a circular display.

In some radiological procedures, a patient faces an x-ray emitter. The patient is then in antero-posterior position: the front side of the patient is closer to the viewer, and the patient's back is further from the viewer. In some other radiological procedures, the patient faces away from the x-ray emitter, in postero-anterior position.

Single piece "L" or "R" markers are known in the related art to identify the left or right side, respectively. Two or more separate markers are also known in the related art. The related art teaches various marker systems, some of which include: U.S. Pat. Nos. 1,576,781, 4,274,006, 4,506,676, 5,052,035, 5,193,106, 5,394,456, 5,469,847, 6,160,870, 6,354,737, 6,470,207, 7,092,492, 7,123,690, and 7,313,430; USPA 20040081284, 20050157847, and 20060065273; and international applications WO96/025111, WO05/018288, and WO06/036248. An online catalog of Techno-Aide, Inc. of Nashville, Tenn. teaches markers known in the related art.

However, markers in the related art consistently do not provide simultaneous orientation as to antero-posterior, cranio-caudal and left-right positioning by a single marker. Also, placing an "R" marker on the patient's left side results in incorrect image orientation; the "R" appears on the right side of the image, which initially appears correct. However, in an antero-posterior view of the patient, the patient's left side is on the right side of the image; thus, the "R" should appear on the left side of the image in correlation with the patient's right side. Misorientation can lead to accidents in medical procedures if an incorrect position is not identified, especially prior to invasive procedures. Confusion results when an image appears reversed on a left-right axis, or unclear as to cranio-caudal or antero-posterior orientation. If the incorrect position is only identified after a procedure begins, the misoriented image has to be corrected during the procedure, increasing procedure time.

Multiple individual markers could be used to provide simultaneous orientation as to multiple directions, but their relative orientation is not fixed and is subject to error. Also, using multiple markers requires extra time, slowing down positioning. Separate pieces can also be easily lost. Even with accurately placed separate left and right markers, the patient's cranio-caudal position in the image is not necessarily clear. Although cranio-caudal orientation can be inferred by using the spine as a bony landmark, this does not immediately confer left-right orientation with respect to the patient's body. Further, the spine is not always in view.

It can be seen, then, that there is a need in the art for a marker that provides immediate visual correlation as to multiple directional aspects of a patient's anatomy, so that a fluoroscopy can proceed more quickly, with greater accuracy, and greater confidence. It can also be seen that there is a need to provide an easy-to-use, single piece marker that quickly provides orientation as to the anterior, posterior, left, right, cranial, and caudal directions without excessive time to position, and without multiple pieces. Also, it can be seen that there is a need to enhance quality of healthcare service so that x-ray images and records are clearer and more effective, especially in life-threatening medical situations or in the context of litigation. Moreover, it can be seen that there is a need to reduce unnecessary radiation exposure. Finally, it can be seen that there is a need to address any combination of these problems.

SUMMARY OF THE INVENTION

To minimize the limitations in the prior art, and to minimize other limitations that will become apparent upon reading and understanding the present specification, the present invention discloses a method for orienting a radiological image with a patient's anatomical position, comprising the step of forming a marker with a first side indicator and a second side indicator formed substantially opposite the first side indicator. Further, the present invention discloses a marker comprising a first side indicator, a second side indicator, a cranial indicator, and a humanoid shape. The description of the preferred embodiments is to be understood as non-limiting examples of the present invention. The true scope of the invention is to be understood by the claims and not limited by the preferred embodiments.

In a preferred embodiment of the present invention, the marker can be positioned on a patient's body to appear in the x-ray image. In another preferred embodiment of the present invention, the marker can be placed on an x-ray emitter.

It is an object of the present invention to reduce error from a misoriented x-ray image that would otherwise result from a conventional left or right marker. It is another object of the invention to reduce error from a misoriented x-ray image that results from ambiguity as to left, right, cranial, caudal, anterior or posterior orientation of a patient's body position. It is still another object of the present invention to quickly and effectively orient the patient's left, right, cranial, and caudal directions in a localized fluoroscopy image with a single-piece marker.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
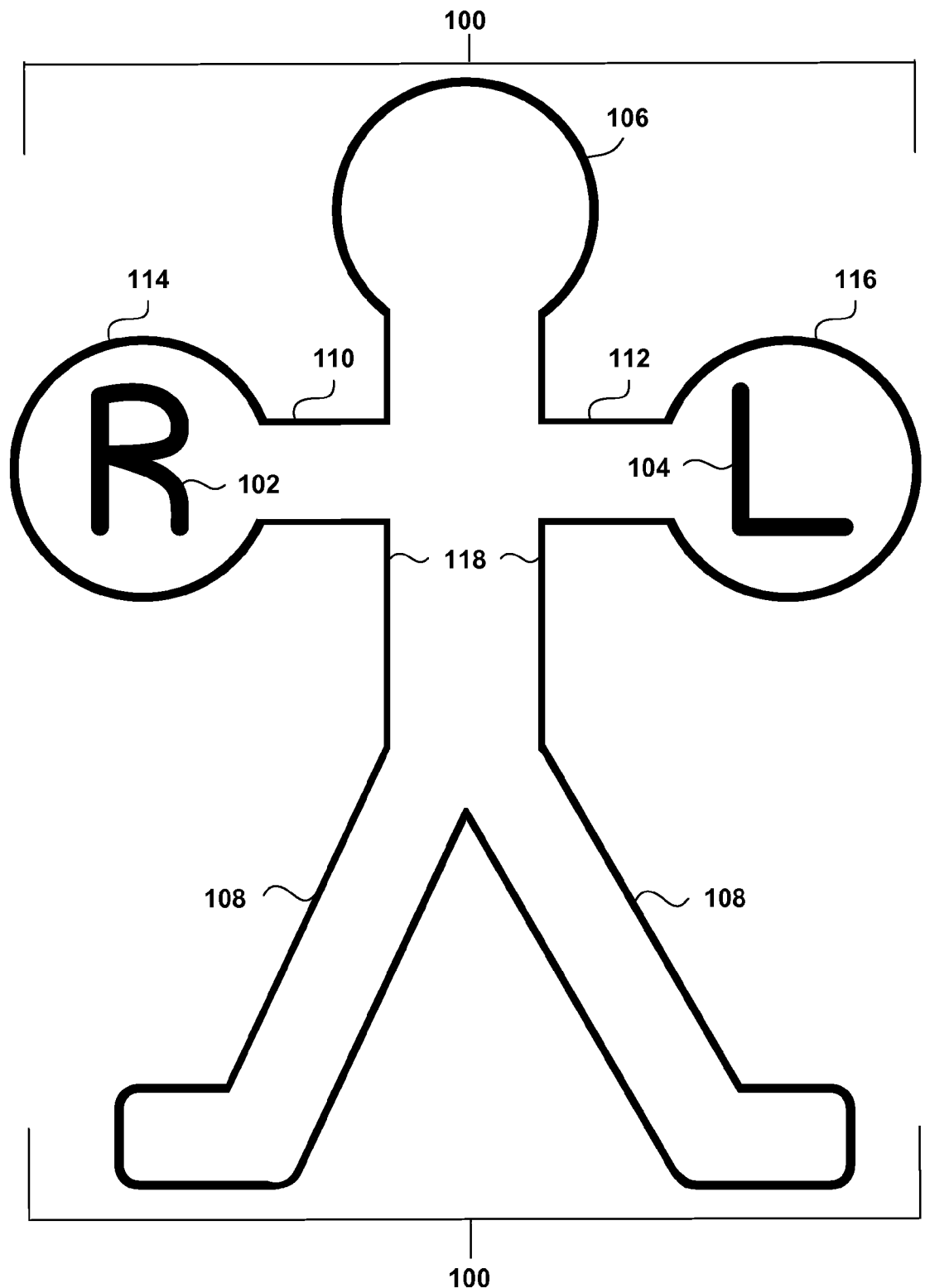
FIG. 1 illustrates an antero-posterior view of a preferred embodiment of the present invention.

In the following description of the preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

To aid in a basic understanding of a possible simplified embodiment of the present invention, and referring generally to the figures and numeric references throughout, marker 100 can be embedded in radiolucent material 400 with first side indicator 102, second side indicator 104, cranial indicator 106, caudal indicator 108, anterior indicator 600, and posterior indicator 700.

It will be understood that "x-ray" can refer to any radiological technique. It will be understood that "radiological image," "fluoroscopy image," "x-ray image," and "image" can be used interchangeably and can each refer to any radiological record or viewing apparatus, digital or non-digital. It will be understood that "extends from" can be interchangeable with "is adjacent to," "extends from a position adjacent to." It will be understood that "embedded in" can also mean "encased in," "partially embedded in," "partially encased in," "removably fixed in," "fixably attachable to," or "permanently fixed within." It will be understood that "removable from" can also mean "insertable into." It will be understood that "transparent" and "non-transparent" generally refer to viewing by the human eye and not by an x-ray technique.

SPECIFICS OF THE INVENTION

FIG. 1 illustrates an antero-posterior view of a preferred embodiment of the present invention.

Marker 100 is shown overall in FIG. 1, with first side indicator 102, second side indicator 104, cranial indicator 106, caudal indicator 108, first arm 110, second arm 112, first hand 114, second hand 116, and torso 118.

Marker 100 can be radiopaque. Marker 100 can be metallic or non-metallic, such as lead, silver, tungsten, iron, titanium, steel, cobalt, chromium, tantalum, copper, graphite, copper, bronze, aluminum, composites, various carbon combinations, other radiopaque substances, heavy metals, solder, or a combination of materials. In most preferred embodiments, marker 100 can have an anterior side for anterior indicator 600 (FIG. 6) and a posterior side for posterior indicator 700 (FIG. 7). Posterior indicator 700 can be substantially opposite anterior indicator 600. In a preferred embodiment, marker 100 can be placed on the patient's abdomen when the patient is facing away from x-ray emitter 1100 located underneath the patient, and anterior indicator 600 can be visible (FIG. 6) to quickly orient marker 100 to the patient's position. In another preferred embodiment, when the patient faces x-ray emitter 1100 located underneath the patient, marker 100 can be placed on the patient's back, and posterior indicator 700 can be visible (FIG. 7). Accordingly, marker 100 would show up on an x-ray image having the same orientation as the patient's body. Marker 100 can be an outline shape (as shown in FIG. 1), a solid shape, or any variation of patterns or interrelating parts that essentially comprise an anatomical form such as a humanoid shape.

With reference to marker 100, an aspect of the present invention is to provide anatomical directions to more effectively orient patient-image positioning. One skilled in the art can see that it is possible to form marker 100 by varying shapes, widths, depths, angles, and curves, without departing from the spirit of the invention. The humanoid shape of marker 100 can be a solid line, series of lines, pattern of shapes roughly corresponding to a body or an at least one anatomical feature, or an outline of a humanoid. In some embodiments, marker 100 can be autoclavable. In some other embodiments, marker 100 can be disposable. In some preferred embodiments, marker 100 can be substantially covered by radiolucent material 400. In other possible embodiments, marker 100 can be radiolucent and instead of radiolucent material 400, there can be a negatively shaped radiopaque material, which creates a negative image in x-ray to show an anatomical form. However, radiopaque material should be minimized to allow more of the patient's x-ray image to be seen.

First side indicator 102 and second side indicator 104 can be radiopaque. First side indicator 102 can have the letter "R" to indicate right or the letter "L" to indicate left. Second side indicator 104 should not designate the same side as first side indicator 102.

Figure 2:
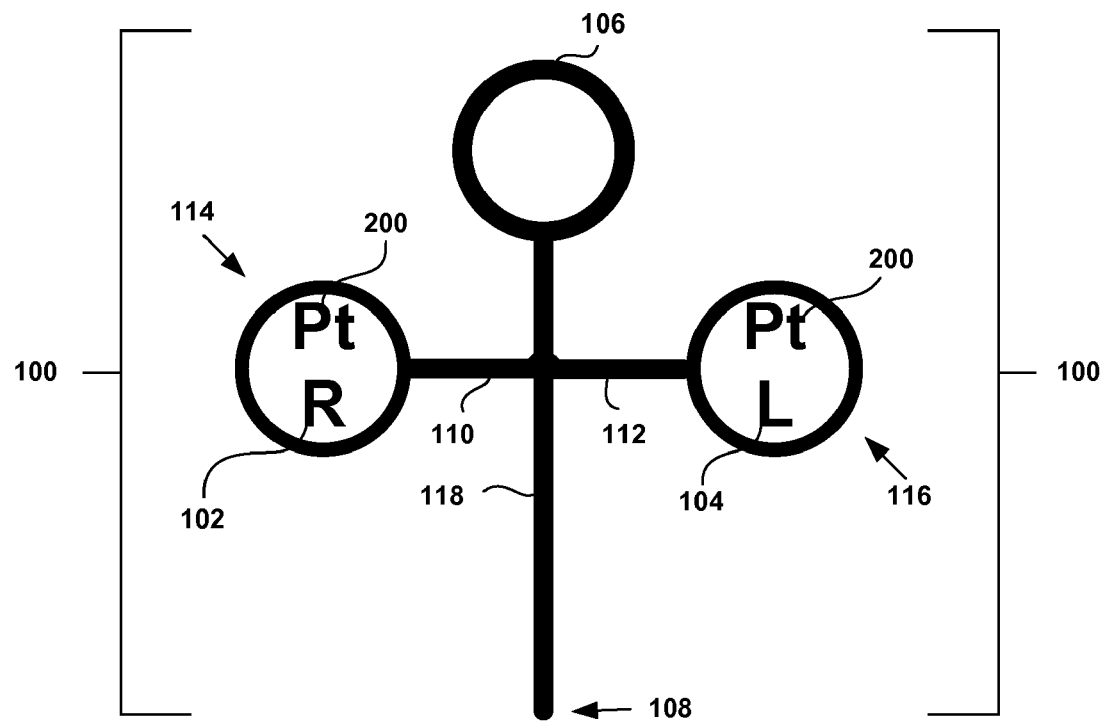
FIG. 2 illustrates an antero-posterior view of another preferred embodiment of the present invention.

In a preferred embodiment, shown in FIG. 2, first side indicator 102 can be accompanied by patient symbol 200 such as "Pt" which can be understood by one of ordinary skill in the art to be an abbreviation of the word "patient." First side indicator 102 can have an at least one color. In a preferred embodiment, where first side indicator 102 is a right side indicator, the at least one color of first side indicator 102 can be red. If second side indicator 104 is a left side indicator, second side indicator 104 can be blue.

Cranial indicator 106 can be radiopaque. In a possible embodiment, cranial indicator 106 can be in the shape of a head. FIG. 1 shows cranial indicator 106 in the form of a rounded ovular shape, which can be understood to correspond to the direction of the patient's head. In a possible embodiment, cranial indicator 106 can be present without torso 118 while still providing orientation to a practitioner. In some possible embodiments, cranial indicator 106 can be an arrow. In some possible embodiments, cranial indicator 106 can be a bulging dot on one end of a cranio-caudal line. In some possible embodiments, cranial indicator 106 can be any letter, word, or symbol describing cranial direction. Some non-limiting examples for cranial indicator 106 can be "H," "head," "cranial," "CR," "C," or "cranium."

Caudal indicator 108 can be radiopaque. In some embodiments with no torso 118, caudal indicator 108 can be opposite cranial indicator 106. In a possible embodiment, cranial indicator 106 and caudal indicator 108 can together form a line. In some embodiments, caudal indicator 108 can be a terminating end of a line (FIGS. 2 and 3) or a pair of legs (FIG. 1). In some embodiments, it can be sufficient to provide orientation to a practitioner with cranial indicator 106 and no caudal indicator 108. However, in most preferred embodiments, caudal indicator 108 can be present to more quickly and easily recognize caudal direction without inference. Thus, cranio-caudal orientation can be achieved promptly. In some possible embodiments, caudal indicator 108 can be any letter, word, or symbol describing caudal direction. Some non-limiting examples for caudal indicator 108 can be "F," "foot," "caud," "caudal," "down," "D," or "feet."

First arm 110 and second arm 112 can extend from torso 118. In embodiments where torso 118 is absent, first arm 110 and second arm 112 can be on opposite sides corresponding to first side indicator 102 and second side indicator 104, respectively. First arm 110 and second arm 112 can be formed by a single line substantially perpendicular to torso 118. First arm 110 and second arm 112 can be formed by a curved line, angled line, or other substantially continuous shape that maintains the general appearance of an arm. This can assist a practitioner in correlating first arm 110 with first side indicator 102 and the patient's corresponding side. First arm 110 and second arm 112 can extend in any direction from torso 118.

First hand 114 can be formed at a distal end of the first arm. First hand 114 can form around first side indicator 102. First hand 114 can add anatomical descriptiveness to the overall shape of marker 100, thus enhancing orientation.

Second hand 116 can be formed at a distal end of the second arm. Second hand 116 can form around second side indicator 104.

Figure 3:
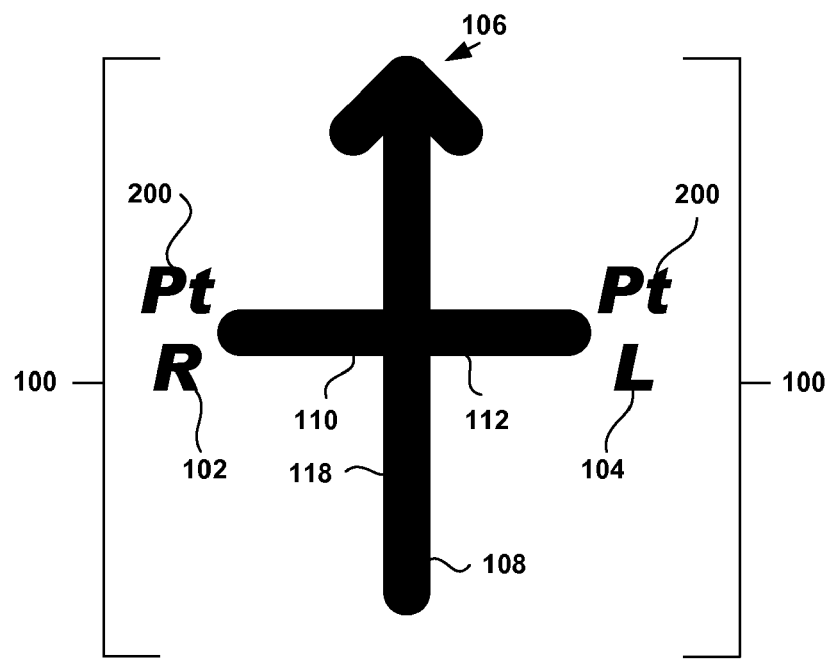
FIG. 3 illustrates an antero-posterior view of another preferred embodiment of the present invention.

Torso 118 can be radiopaque. In some possible embodiments, torso 118 can be in the shape of a line (FIGS. 2 and 3). Torso 118 can thus aid in cranio-caudal orientation by providing a cranio-caudal line. In a preferred embodiment, torso 118 can be formed by an outline (FIG. 1). One advantage of having torso 118 can be to further unite multiple directional indicators. In most preferred embodiments, torso 118 provides alignment with the spine of the patient, thus enhancing directional orientation. In some embodiments, torso 118 can physically connect multiple side indicators so that placement of marker 100 can occur efficiently.

FIG. 2 illustrates an antero-posterior view of a preferred embodiment of the present invention.

Patient symbol 200 is shown in FIG. 2, with marker 100, first side indicator 102, second side indicator 104, cranial indicator 106, caudal indicator 108, first arm 110, second arm 112, first hand 114, second hand 116, and torso 118.

Patient symbol 200 can be a letter, word, phrase, or symbol that indicates that a particular aspect of anatomy can correlate with the patient's anatomy. In some exemplary embodiments, patient symbol 200 can be the word "Pt," "Pt's," "P's," "patient," "patient's," "of Pt," or "of Patient." Patient symbol 200 can reduce confusion when marker 100 is placed on the patient, to indicate that the letter "R" should be on the patient's right side when placing marker 100. In a preferred embodiment, patient symbol 200 can have the letters "Pt" and first side indicator 102 can be "R" to indicate correspondence of marker 100 to the patient's given anatomical direction. In some possible embodiments, "Pt" can appear above the letter "R" such that "Pt R" appears on the image's left side, which correctly corresponds to the patient's right side when viewed in antero-posterior position in x-ray.

FIG. 3 illustrates an antero-posterior view of a preferred embodiment of the invention.

Cranial indicator 106 is shown in FIG. 3 with marker 100, first side indicator 102, second side indicator 104, caudal indicator 108, first arm 110, second arm 112, and torso 118.

Cranial indicator 106 can be formed in the shape of an arrow.

Patient symbol 200 can be adjacent to first side indicator 102.

Figure 4A:
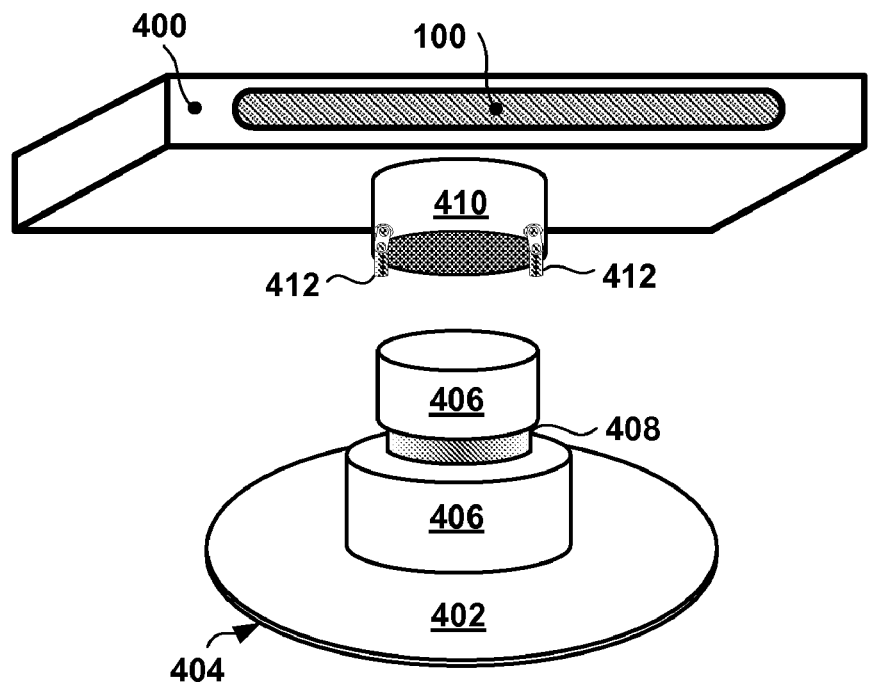
FIG. 4A illustrates an exaggerated side angle view of another preferred embodiment of the present invention.

FIG. 4A illustrates an exaggerated side angle view of yet another preferred embodiment of the present invention.

Radiolucent material 400 is shown in FIG. 4A, with sticker 402, nipple 406, groove 408, acceptor 410, lip 412, and marker 100.

Radiolucent material 400 can be plastic or non-plastic. In a preferred embodiment, radiolucent material 400 can be transparent plastic. Some non-limiting exemplary materials for radiolucent material 400 can be: rubber, fiberglass, acrylic, vinyl, acrylic, synthetic resin, methyl methacrylate (MMA), polymethyl methacrylate (PMMA), or any combination thereof. In a preferred embodiment, an at least one radiopaque portion of marker 100 can be seen through radiolucent material 400 by the naked eye. In another preferred embodiment, radiolucent material 400 can have a humanoid form. Marker 100 can be partially or wholly embedded in radiolucent material 400. In some possible embodiments, radiolucent material 400 can be absent. In some preferred embodiments, radiolucent material 400 can have a smooth surface that can be easily cleaned or wiped down with sanitizing spray, thus decreasing chances of infection. In some preferred embodiments, radiolucent material 400 can have rounded edges. In other embodiments, marker 100 can be placed in an autoclave to achieve sterilization. However, prior to positioning marker 100 on the surface of the patient, simple cleaning of marker 100 or radiolucent material 400 with sanitizing spray would be consistent with the policies of most healthcare facilities. Autoclavability is preferred where marker 100 is to be placed inside a body cavity, but would be unnecessary if marker 100 is simply used outside of the patient to show up on x-ray. In another preferred embodiment, radiolucent material 400 can be circular-shaped and approximately two inches in diameter. Further, marker 100 can be used for the initiation of x-ray machine setup, even before the patient is positioned between x-ray emitter 1100 and x-ray sensitive medium 1102, where there is an anticipated position of the patient. In addition, marker 100 can be used again for patient alignment after the patient is positioned between x-ray emitter 1100 and x-ray sensitive medium 1102.

Sticker 402 can help enhance stability during positioning on the patient's body so that shifting is reduced from the time marker 100 is placed "$t_1$" to the time the practitioner creates the x-ray image "$t_2$." Instead of sticker 402, belt 500 (FIG. 5) or clip 800 (FIG. 8) can be used to help stabilize marker 100. In a possible embodiment, sticker 402 can be on an at least one side of marker 100. Sticker 402 can be radiolucent.

Adhesive layer 404 can be formed on a side of sticker 402. Other intermediary materials or layers between marker 100 and adhesive layer 404 can be radiolucent.

Nipple 406 can be formed on sticker 402. Nipple 406 can be a male protrusion that can rotatably affix with acceptor 410. Nipple 406 can have a diameter "X" that is slightly greater than the diameter of groove 408 "Y." Nipple 406 can be tapered toward acceptor 410. This can reduce difficulty of insertion. In a preferred embodiment, nipple 406 can be radiolucent.

Groove 408 can be formed on nipple 406. Groove 408 can help impart resistance by removably affixing acceptor 410 with lip 412. Groove 408 can aid in directionally orienting marker 100 by rotatably affixing with lip 412. In most preferred embodiments, friction produced by groove 408 should be less than sticker adhesiveness such that when marker 100 is rotated it does not substantially interfere with placement of sticker 402. In a possible embodiment, groove 408 can be an indentation on nipple 406. In another possible embodiment, groove 408 can be in acceptor 410 and nipple 406 can have lip 412.

Figure 13:
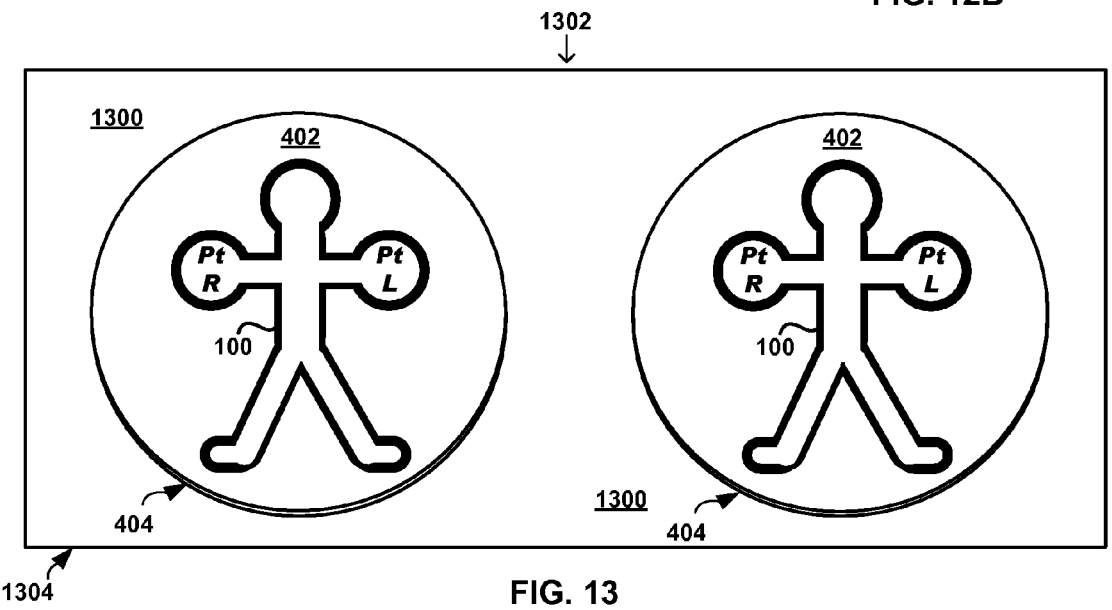
FIG. 13 illustrates an antero-posterior view of a possible embodiment of the present invention.

Acceptor 410 can be formed on radiolucent material 400 or on marker 100. Acceptor can be a female portion, such as a hole. Acceptor 410 can accept nipple 406. In a possible embodiment, marker 100 can have a hole that runs through marker 100 to form acceptor 410 which can then be used to turn marker 100 on either side to rotatably affix with nipple 406. In a possible embodiment, marker 100 can be embedded in sticker 402 without nipple 406 or acceptor 410 (FIG. 13).

Lip 412 can be formed on acceptor 410. In a possible embodiment, lip 412 can be in the shape of a bar. Lip 412 can provide resistance with groove 408. In a possible embodiment, lip 412 can be a flexible flap. In a possible embodiment, lip 412 can be a pair of lines in the shape of a V. In a possible embodiment, lip 412 can be a protruding rim within acceptor 410. In a possible embodiment, lip 412 can slightly reduce the diameter of acceptor 410 such that nipple 406 has some resistance with lip 412. In a possible embodiment, lip 412 can form a resisting ring that is slightly narrower than the acceptor 410. In a possible embodiment, lip 412 can fit on groove 408. Acceptor 410 can have a ring similar to the shape of an audio jack female acceptor which can aid acceptor 410 and nipple 406 to pop into place when interconnected. In a possible embodiment, lip 412 can be spring-loaded to provide flexibility when nipple 406 is inserted into acceptor 410 during placement of marker 100. Acceptor 410, lip 412, marker 100 and radiolucent material 400 can move together as marker 100 is positioned during alignment.

Figure 4B:
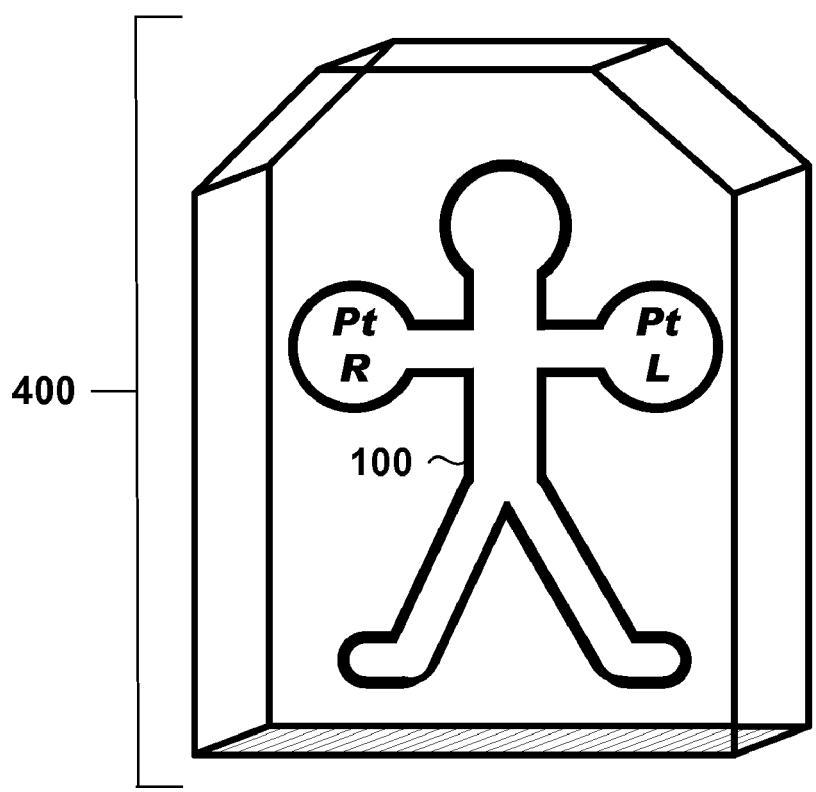
FIG. 4B illustrates an antero-posterior view of another preferred embodiment of the present invention.

FIG. 4B illustrates an antero-posterior view of another preferred embodiment of the present invention.

Marker 100 is shown in FIG. 4B, with radiolucent material 400 in three-dimensional (3-D) form.

Figure 5:
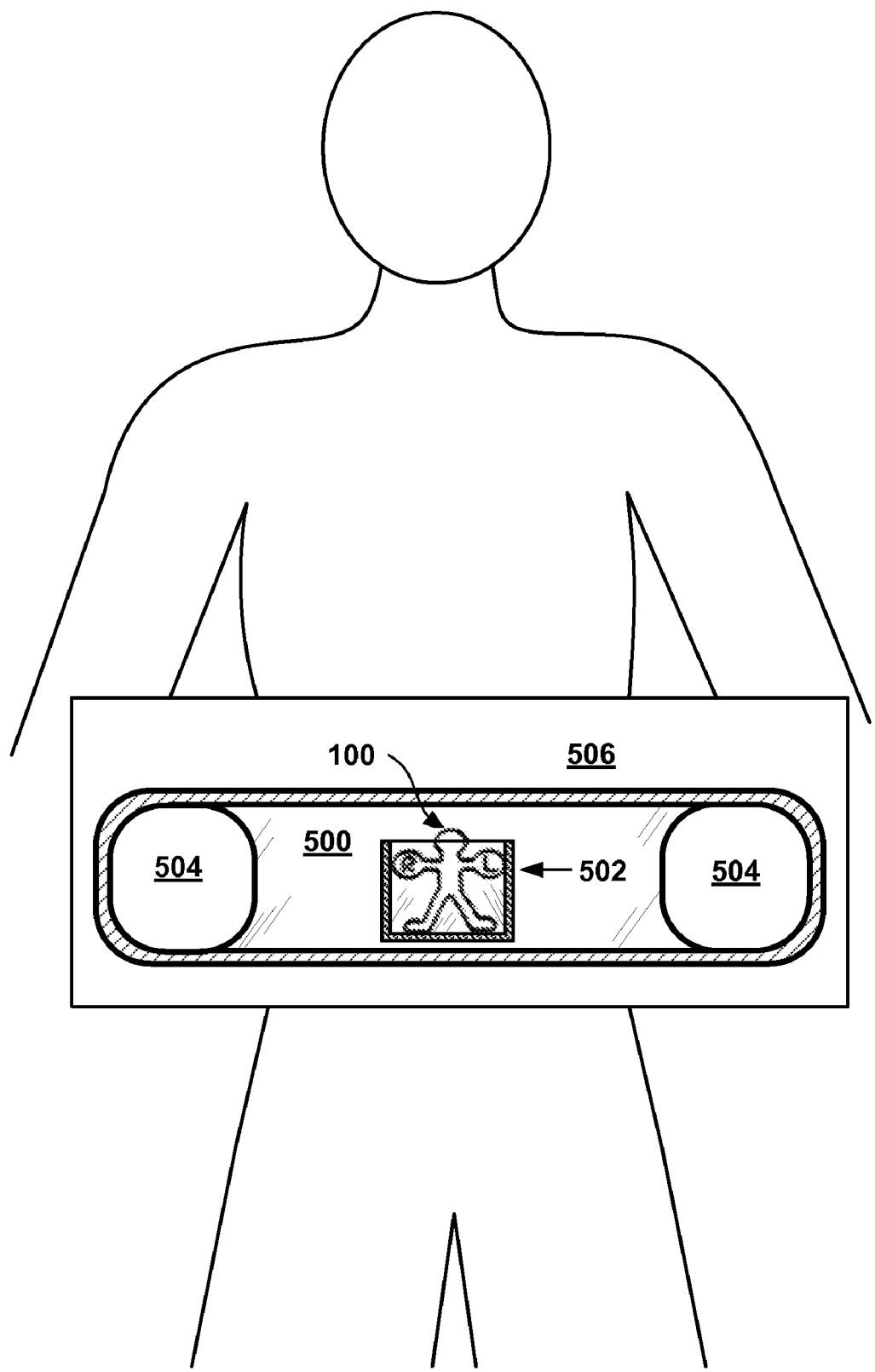
FIG. 5 illustrates an antero-posterior view of another preferred embodiment of the present invention.

FIG. 5 illustrates an antero-posterior view of still another preferred embodiment of the present invention.

Belt 500 is shown in FIG. 5, with marker 100, pocket 502, weighted end 504, and bag 506. Marker 100 is shown partially in pocket 502.

Belt 500 can be made of radiolucent material in most preferred embodiments. Belt 500 can be made of heavy canvas, nylon, polyester, other cloth, composite material, plastic, or other pliable or bendable material. Belt 500 can have pocket 502. Belt 500 can have weighted portion 504 on an at least one end of belt 500. Belt 500 can have marker 100 on a side of belt 500 furthest away from the patient's skin. Belt 500 can have marker 100 removable from pocket 502. In most preferred embodiments, marker 100 and belt 500 can be placed closer to the patient's body so as to avoid creating an x-ray shadow and to minimize image distortion. In most embodiments, belt 500 can be placed on patient's back, chest, abdomen, or any part of the patient's body. In most preferred embodiments, marker 100 can be placed on belt 500 and can be non-rotatable, thus reducing chances of misorientation. In a possible embodiment, belt 500 can be placed substantially perpendicular to the patient's cranio-caudal axis. Therefore, belt 500 can further the objective of quickly orienting marker 100 with patient anatomy during positioning of marker 100.

Pocket 502 can be formed on belt 500. Marker 100 can be placed in pocket 502. Multiple pockets can be formed on belt 500 in a series of pockets. Other markers can be placed in the series of pockets. In most preferred embodiments, marker 100 can be partially or wholly visible while in pocket 502. Pocket 502 can be formed by the same material as belt 500, transparent material, plastic or non-plastic, or cloth with see-through portions. Pocket 502 can help stabilize marker 100 with belt 500 during placement so that shifting is reduced, thereby reducing misorientation.

Weighted portion 504 can have any material that weighs down belt 500. In some possible embodiments, there can be two or more weighted portions that can form on either side of the patient. Weighted portion 504 can further enhance stability of marker 100, also reducing misorientation. In most preferred embodiments, two weighted portions 504 can form at both terminating ends of belt 500.

Bag 506 can be a plastic bag that houses the entirety of belt 500. In some possible embodiments, bag 506 can be a clear rectangular plastic disposable bag. In some possible embodiments, bag 506 can be resealable. Bag 506 can also cover marker 100 with belt 500. Using bag 506 is consistent with many medical storage procedures in which medical tools are placed in a plastic bag so that the contents are not exposed to bacteria or viruses during use, and thus can be kept clean.

Figure 6:
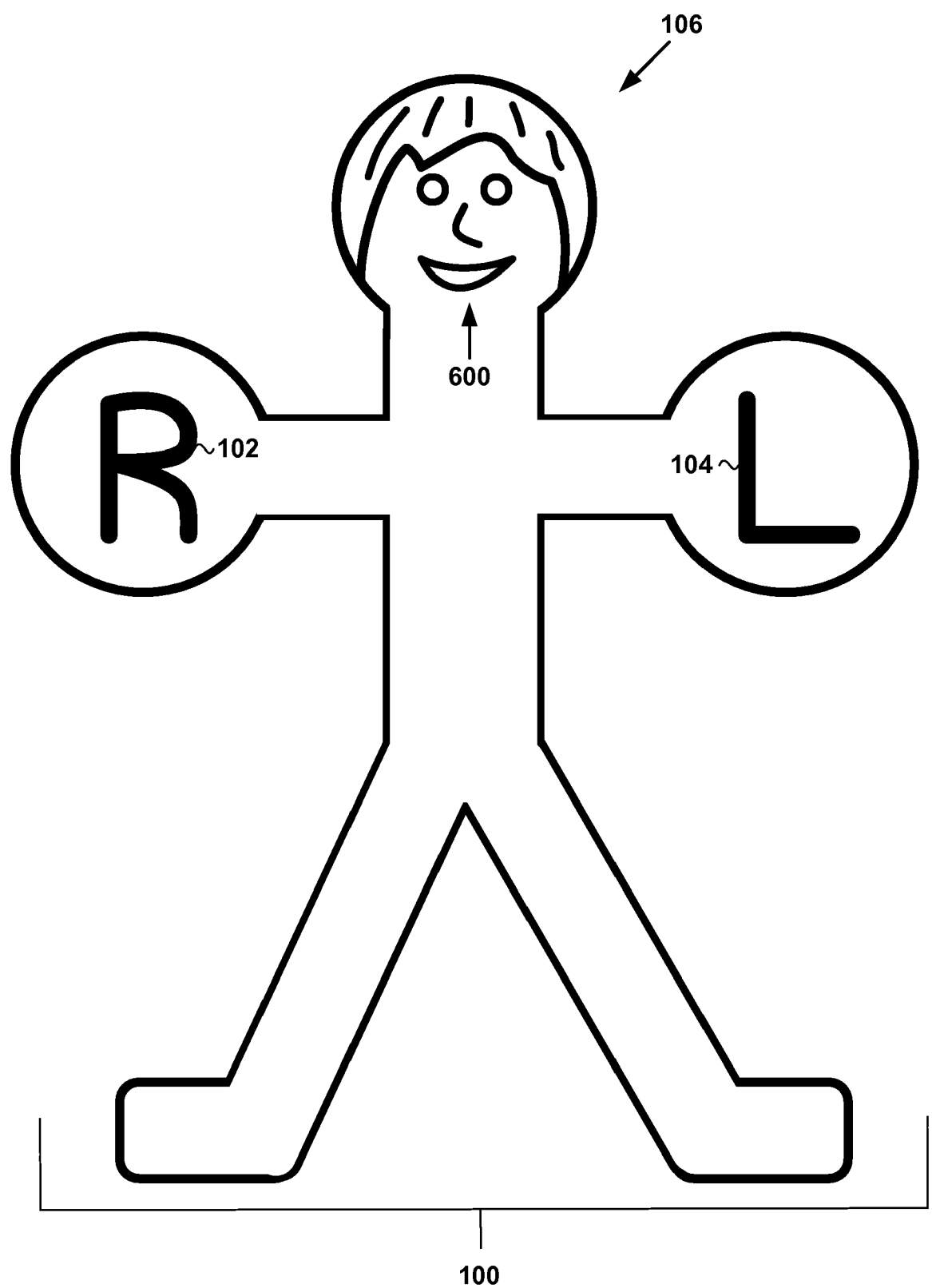
FIG. 6 illustrates an antero-posterior view of another preferred embodiment of the present invention.
Figure 7:
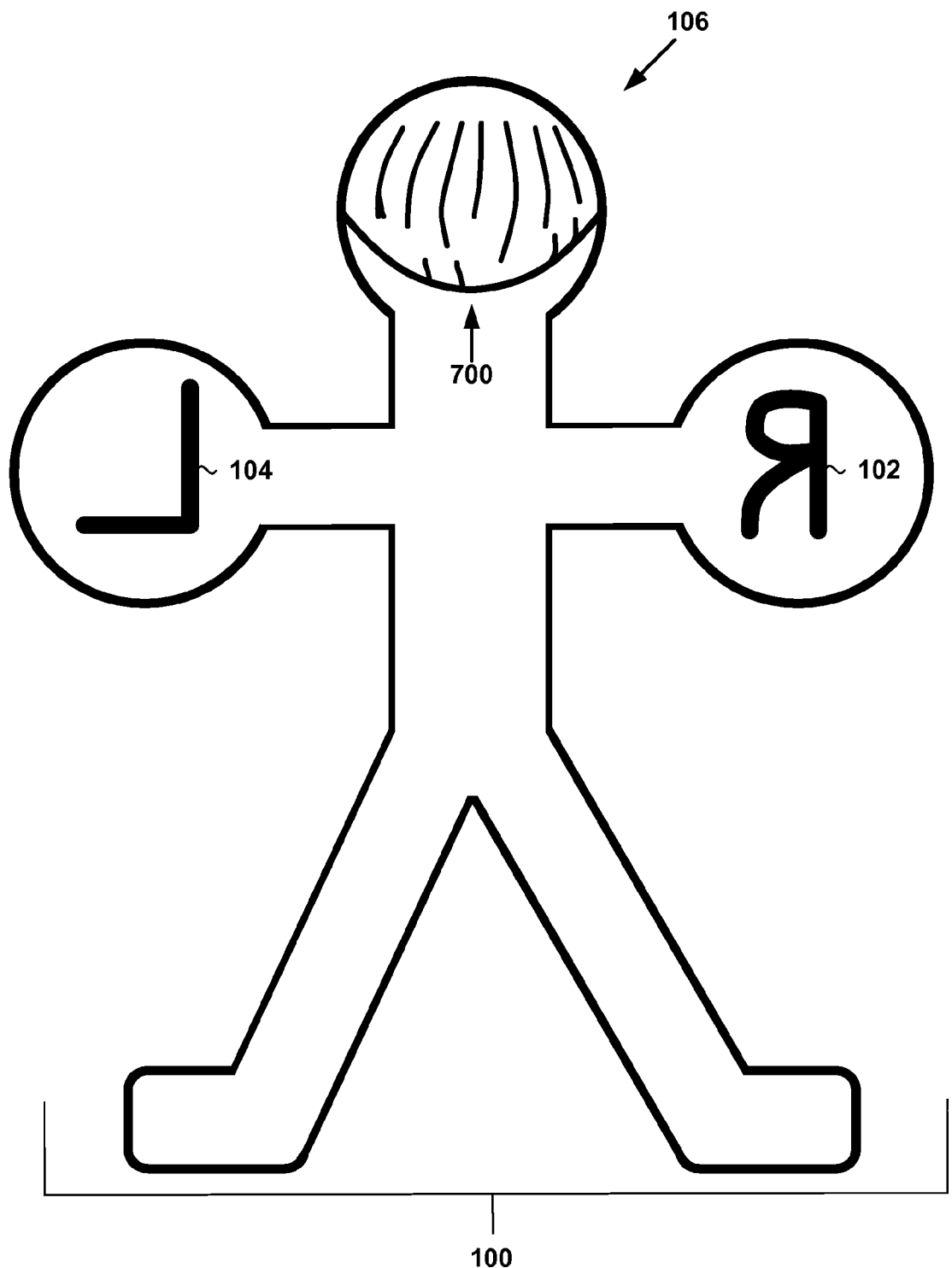
FIG. 7 illustrates a postero-anterior view of another possible embodiment of the present invention.

FIG. 6 illustrates an antero-posterior view of another possible embodiment of the present invention.

Anterior indicator 600 is shown in FIG. 6, with marker 100, first side indicator 102, second side indicator 104, and cranial indicator 106.

Anterior indicator 600 can be formed on marker 100 or on radiolucent material 400. Anterior indicator 600 can be formed on or about cranial indicator 106. Anterior indicator 600 can be any anterior anatomical feature, letters, words, or symbols. An advantage of having anterior indicator 600 or posterior indicator 700 is that a practitioner does not need to check left and right side orientation of the patient after placing marker 100. Anterior indicator 600 can help new or experienced practitioners to position marker 100 correctly and quickly. Since marker 100 should be placed in the same orientation as that of the patient, having anterior indicator 600 can aid in rapid and accurate positioning. By way of non-limiting illustration, such anterior anatomical feature can be: a face, a facial feature indicating a portion of a face, such as eyes, nose, or mouth, teeth, jaw, jaw line, chin, cheeks, the front of a head, a portion of hair with space for a face but having no face, or a pair of protruding feet or a protruding foot indicating anterior direction, or a combination thereof. To illustrate a non-limiting example, anterior indicator 600 can have the form of a humanoid face. Anterior indicator 600 can be formed by a hairline.

In most preferred embodiments, anterior indicator 600 can be radiolucent and non-transparent. In some embodiments, the humanoid face can be shown by a pair of eyes and a mouth. Furthermore, a nose can be shown. In other possible embodiments, an image of a frontal anatomical person can be shown. In other embodiments, caudal indicator 108 can have the form of a pair of legs where a pair of feet protrudes at a roughly perpendicular angle to form anterior indicator 600. Anterior indicator 600 can aid in showing anterior direction. In a preferred embodiment, anterior indicator 600 can be a face drawn on an adhesive anterior indicator sticker placed on marker 100 or on radiolucent material 400. In some embodiments, anterior indicator 600 can have lines indicating hair. In embodiments where anterior indicator 600 displays letters, words, or symbols, some non-limiting examples can be: "AP," "ant," "anterior," "front", "front side up," "face," "face-up," or "this side up if patient face up." Anterior indicator and posterior indicator 700 can be used in combination with patient symbol 200.

FIG. 7 illustrates a postero-anterior view of another possible embodiment of the present invention.

Posterior indicator 700 is shown in FIG. 7, with marker 100, first side indicator 102, second side indicator 104, and cranial indicator 106.

Posterior indicator 700 can be formed on or about cranial indicator 106. Anterior indicator 600 and posterior indicator 700 can be on opposite facing sides. Embedding anterior indicator 600 and posterior indicator 700 in radiolucent material 400 can reduce wear and tear. Non-transparent layer 602 can be between posterior indicator 700 and anterior indicator 600. To illustrate a non-limiting example, posterior indicator 700 can have the appearance of the back of a humanoid head. Posterior indicator 700 can be an oval shape with lines therein to indicate hair. In some embodiments, posterior indicator 700 can be an outline of hair showing the back of a head. In another possible embodiment, posterior indicator 700 can also be on non-transparent layer 602. In some embodiments, posterior indicator 700 can display letters, words, or symbols. Some non-limiting examples can be: "PA," "pos," "post" "posterior," or "back", "back side up," "face-down," or "this side up if patient face down."

Figure 7B:
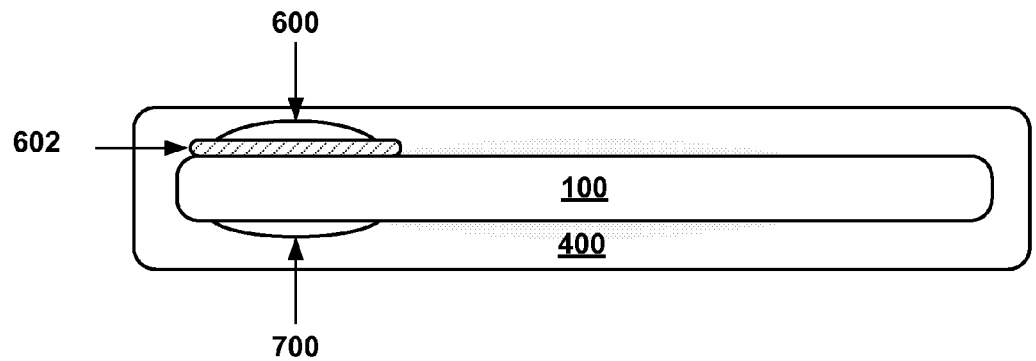
FIG. 7B illustrates a cross-sectional layered view of another possible embodiment of the present invention.

FIG. 7B illustrates a cross-sectional layered view of another possible embodiment of the present invention.

Anterior indicator 600 is shown in FIG. 7B, with non-transparent layer 602, marker 100 and radiolucent material 400.

Non-transparent layer 602 can be radiolucent. Non-transparent layer 602 can prevent anterior indicator 600 and posterior indicator 700 from being seen simultaneously, thus avoiding confusion during placement. Some non-limiting examples can be paper, plastic, or another non-transparent material embedded in radiolucent material 400.

Figure 8:
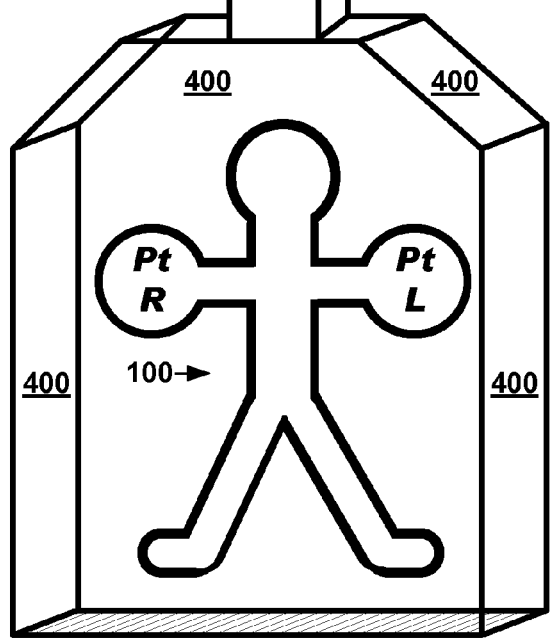
FIG. 8 illustrates an antero-posterior view of a possible embodiment of the present invention.

FIG. 8 illustrates an antero-posterior view of a possible embodiment of the present invention.

Clip 800 is shown in FIG. 8, with marker 100.

Clip 800 can be formed on marker 100 or radiolucent material 400. Clip 800 can help stabilize marker 100 by attaching to a cloth, a medical gown, a bedding material, or another surface on or near the patient's body. Clip 800 can aid in stabilizing the position of marker 100 so that it shows up on x-ray as intended, minimizing sliding or shifting. Thus, proper directional orientation can be furthered. Clip 800 can be used for stability instead of adhesive layer 404 or belt 500. Since non-adhesive and non-clip markers may slip from the surface of the patient, stabilizing marker 100 with clip 800 can help reduce misorientation of marker 100. In some possible embodiments, clip 800 can be attached to an intermediary material or to radiolucent material 400. In a preferred embodiment, clip 800 can be a plastic radiolucent clip. This can be helpful where the patient is standing up or where objects to which marker 100 can be clipped are available.

Figure 9:
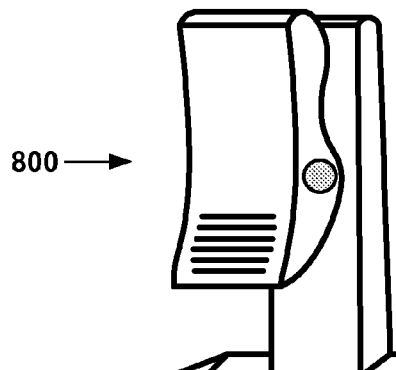
FIG. 9 (PRIOR ART) illustrates a left marker.
Figure 9:
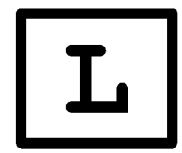
Figure 10:
FIG. 10 (PRIOR ART) illustrates a right marker.
Figure 11:
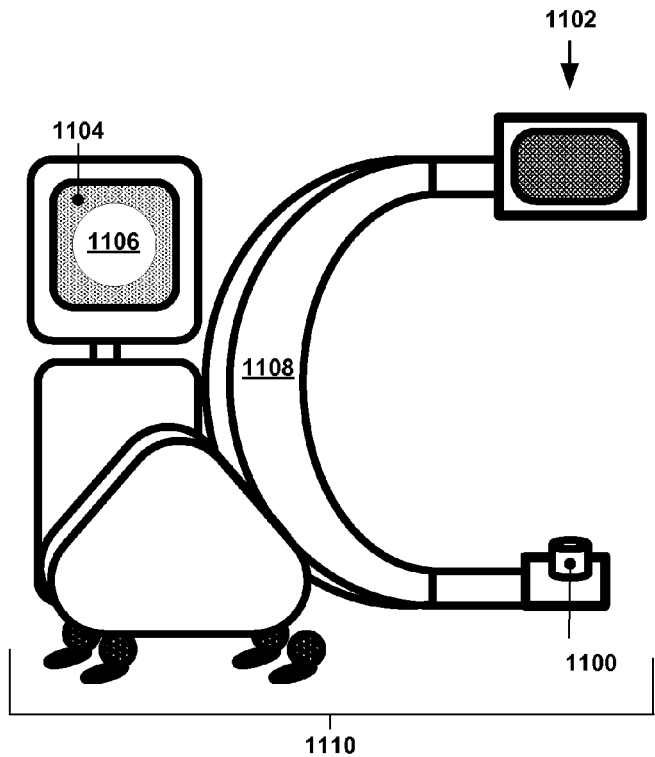
FIG. 11 (PRIOR ART) illustrates an x-ray machine.

FIG. 9 (PRIOR ART) illustrates a left marker.
FIG. 10 (PRIOR ART) illustrates a right marker.
FIG. 11 (PRIOR ART) illustrates an x-ray machine.
X-ray emitter 1100 is shown in FIG. 11, with x-ray sensitive medium 1102, display 1104, circular image 1106, C-arm 1108, and x-ray machine 1110. Understanding these elements can aid in appreciating the present invention.

X-ray emitter 1100 typically discharges x-rays. X-ray emitter 1100 can be stationed or movable. X-ray emitter 1100 can emit x-rays toward and through patient from either postero-anterior or antero-posterior position.

X-ray sensitive medium 1102 can be any x-ray sensitive material or system.

Display 1104 can show x-ray images.

Circular image 1106 can typically be reversed, rotated, or flipped to orient positioning of x-ray image 1106 within circular image 1106. In some x-ray machines, display shapes can be other than circular.

C-arm 1108 can position x-ray emitter 1100 and x-ray sensitive medium 1102 with patient in between.

X-ray machine 1110 is typically on wheels. C-arm 1108 is typically on the patient's left side or on the patient's right side. X-ray machine positioning typically must be adapted to the patient each time a procedure is performed. Then, image orientation can be performed and all aspects of patient anatomy must be understood prior to performing a procedure. Image positioning cannot be predetermined for all patient scenarios, since x-ray machine positioning may be different with each procedure. Thus, image position must be adjusted at the time of each procedure.

Figure 12A:
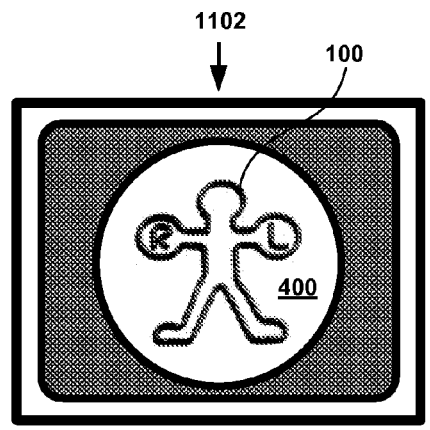
FIG. 12A illustrates a close-up antero-posterior view of a preferred embodiment of the present invention.

FIG. 12A illustrates a close-up antero-posterior view of a preferred embodiment of the present invention.

Marker 100 is shown in FIG. 12A, with radiolucent material 400, and x-ray sensitive medium 1102.

Marker 100 can be placed near x-ray sensitive medium 1102 or near x-ray emitter 1100 to orient the fluoroscopy prior to or during the patient's positioning. Marker 100 can be planar to x-ray sensitive medium 1102. Marker 100 can also be placed prior to imaging the patient by placing marker 100 on x-ray sensitive medium 1102. Marker 100 can also be placed prior to setting up x-ray machine 1110 when patient's anticipated position is known. Thus, there can be higher confidence that x-ray machine 1110 and patient are properly positioned, and misorientation can be reduced.

Figure 12B:
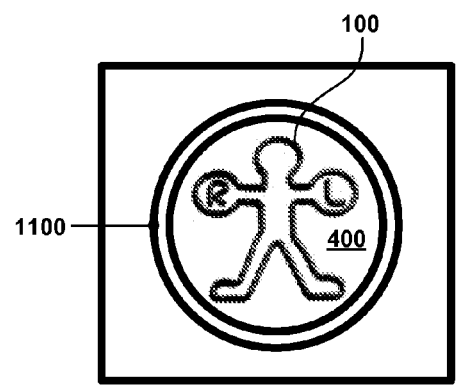
FIG. 12B illustrates a close-up antero-posterior view of a preferred embodiment of the present invention.

FIG. 12B illustrates a close-up antero-posterior view of a preferred embodiment of the present invention.

Marker 100 is shown in FIG. 12B, with radiolucent material 400, and x-ray emitter 1100.

Marker 100 can be placed near x-ray emitter 1100 to orient the fluoroscopy prior to or during the patient's positioning.

FIG. 13 illustrates an antero-posterior view of a possible embodiment of the present invention.

Marker 100 is shown in FIG. 13, with sticker 402, adhesive layer 404, set of stickers 1300, perforation 1302, and roll 1304.

Sticker 402 is shown in a possible embodiment with marker 100, without nipple 406 or groove 408. Sticker 402 can be provided in a roll with perforations between a set of stickers 402. Sticker 402 can be peeled from roll 1304.

Set of stickers 1300 can comprise sticker 402. Marker 100 can be adhered to sticker 402 or embedded in sticker 402. Set of stickers 1300 can be a continuous group of stickers 402.

Perforation 1302 can be between each sticker 402 on roll 1304.

Roll 1304 can be a paper backing from which sticker 402 can be removed.

Figure 14:
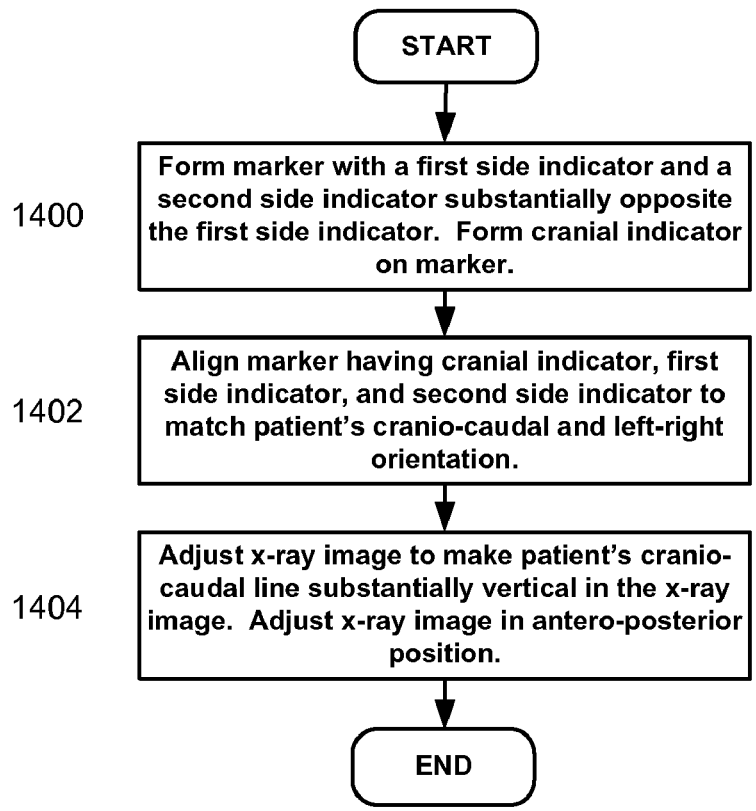
FIG. 14 illustrates a method of a possible embodiment of the present invention.

FIG. 14 illustrates a method of a possible embodiment of the present invention.

FIG. 14 shows forming step 1400, cranio-caudal aligning step 1402, and image adjusting step 1404.

Forming step 1400 can comprise forming a radiopaque marker with a first side indicator and a second side indicator substantially opposite the first side indicator. Forming step 1400 orients a radiological image with a patient's anatomical position since a single marker with a plurality of indicators simultaneously orients multiple anatomical directions. A cranial indicator can also be formed on the marker.

Aligning step 1402 can comprise aligning the cranial indicator toward the patient's head. Aligning step 1402 can comprise placing the marker in alignment with patient's left-right and cranio-caudal directions. In most preferred embodiments, the marker can be placed so that the cranio-caudal line of the marker is aligned with the patient's spine. In some possible embodiments, the marker can be placed on an x-ray emitter, on x-ray sensitive medium, or on the patient. In some other embodiments, the marker can be placed on a patient's bed, or on an attachment to the bed. One advantage of aligning step 1402 is achieving multiple directional orientations without multiple markers. Less image flipping and rotation is required to properly orient the image with the patient's orientation in fluoroscopy. This can save significant effort while providing greater accuracy in medical procedures.

Image adjusting step 1404 can include rotating, reversing, shifting, zooming, or otherwise manipulating an x-ray image. In a preferred embodiment, image adjusting step 1404 can comprise adjusting the x-ray image so that the patient's cranio-caudal line is substantially vertical in the x-ray image and the x-ray image is in antero-posterior position.

Figure 15:
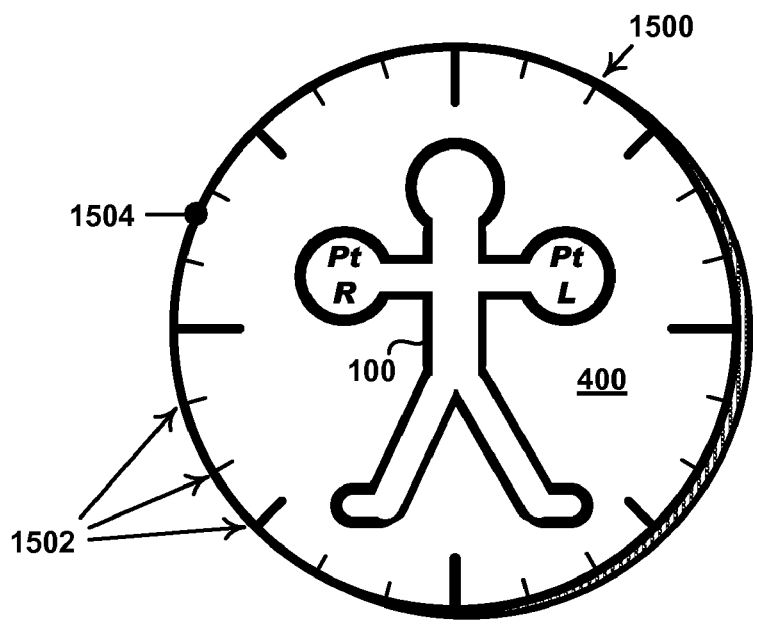
FIG. 15 illustrates an antero-posterior view of another possible embodiment of the present invention.

FIG. 15 illustrates an antero-posterior view of another possible embodiment of the present invention.

Marker 100, radiolucent material 400, hash mark 1500, plurality of hash marks 1502, and circular periphery 1504 are shown in FIG. 15.

Hash mark 1500 can be radiopaque. Hash mark 1500 can provide visual guidance to position marker 100. Hash mark 1500 can also provide visual guidance to orient the x-ray image. In most preferred embodiments, hash mark 1500 is provided at 90 degree angles. Hash mark 1500 can be drawn substantially radiating from the center of circular periphery 1504.

Plurality of radiopaque hash marks 1502 can be formed peripherally about radiolucent material 400. In a preferred embodiment, radiolucent material 400 can be circular. In a preferred embodiment, a plurality of radiopaque hash marks 1502 can comprise hash marks 1500 at 15 degree increments. In some less preferred embodiments, plurality of radiopaque hash marks 1502 can comprise hash marks 1500 at 22.5 or 30 degree increments.

Circular periphery 1504 can be formed on radiolucent material 400. In most preferred embodiments, circular periphery 1504 can be formed on the outer edge of radiolucent material 400 to allow marker 100 and plurality of hash marks 1502 to be easily manipulated by hand. Circular periphery 1504 can be radiolucent to minimize obstruction of the x-ray image.

Figure 16A:
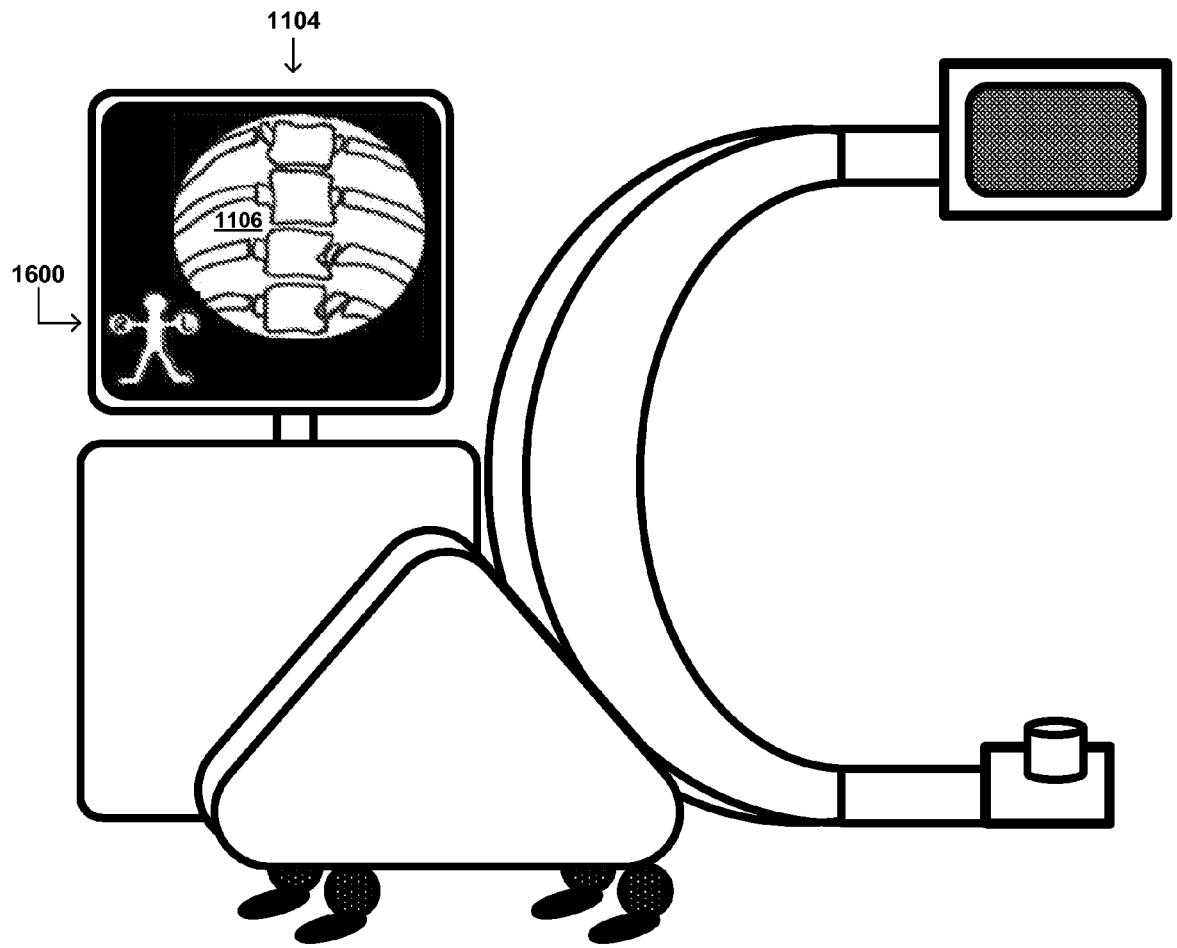
FIG. 16A illustrates a distant view of a possible embodiment of the present invention.

FIG. 16A illustrates a distant view of a possible embodiment of the present invention.

Marker image 1600 is shown in FIG. 16A with display 1104, and circular image 1106.

Marker image 1600 can be humanoid-shaped. Marker image 1600 can be shown in a computer-generated display, recorded digitally, or imprinted on, affixed to, or adjacent to an x-ray image. Marker image 1600 can have visual properties of marker 100. Marker image 1600 can be shown in x-ray, digital or non-digital. Marker image 1600 can be shown in display 1104 adjacent to circular image 1106. Marker image 1600 can be shown in x-ray without using any physical marker, such as marker 100. Marker image 1600 can help orient x-ray images by providing a visual correlation. Marker image 1600 can be shown with an x-ray image to aid in x-ray machine setup, patient placement, marker placement, marker adjustment, and image adjustment.

Figure 16B:
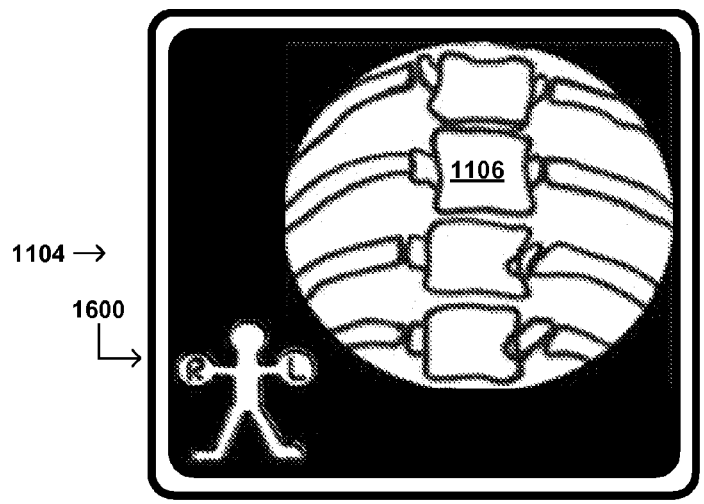
FIG. 16B illustrates an expanded view of a possible embodiment of the present invention.

FIG. 16B illustrates an expanded view of a possible embodiment of the present invention.

Marker image 1600 is shown in FIG. 16B with display 1104, and circular image 1106.

Figure 17:
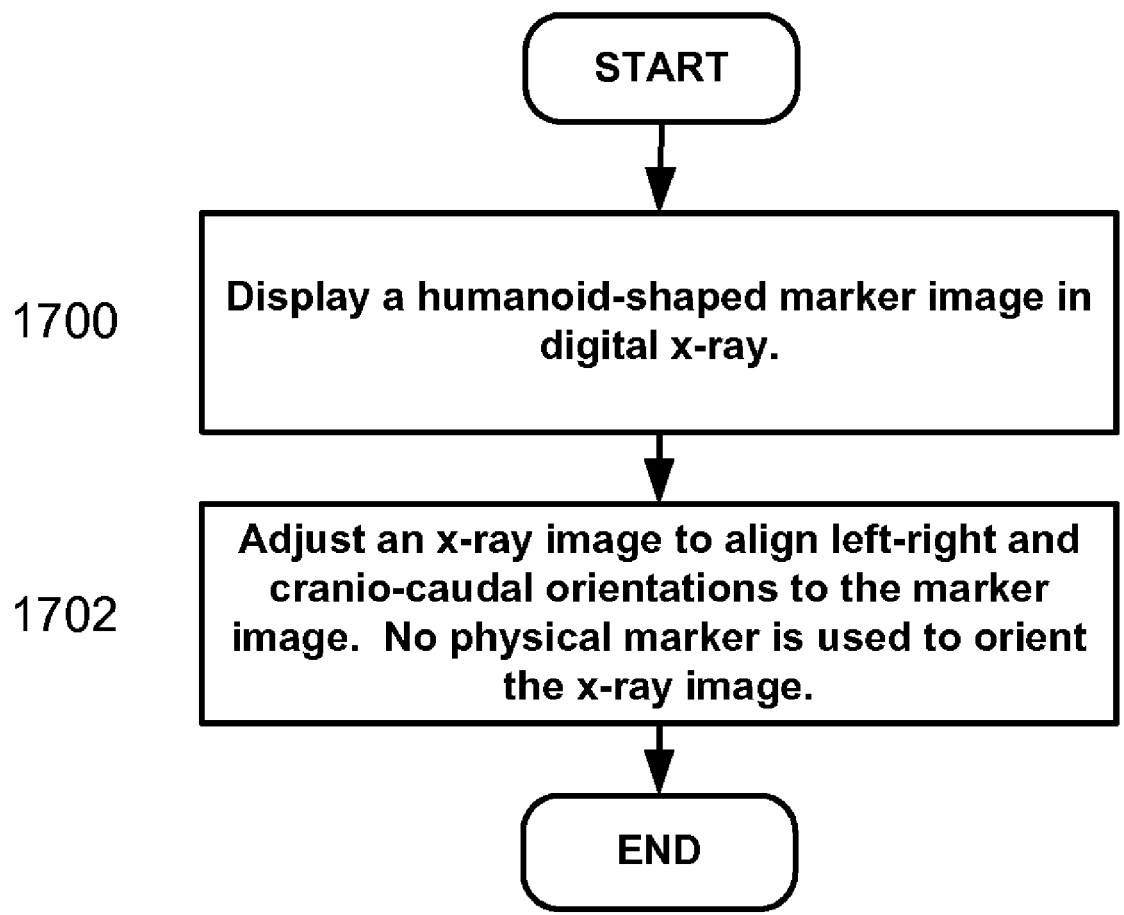
FIG. 17 illustrates another method of a possible embodiment of the present invention.

FIG. 17 illustrates another method of a possible embodiment of the present invention.

Display marker image step 1700 is shown in FIG. 17, with adjust x-ray image step 1702.

Display marker image step 1700 can comprise displaying a humanoid-shaped marker image. Display marker image step 1700 can occur in digital or non-digital media. Display marker image step 1700 can occur subsequently when a record is reproduced digitally or in hard copy. A preferred embodiment can display marker image 1600 in humanoid shape.

Adjust x-ray image step 1702 can comprise adjusting an x-ray image to align left-right and cranio-caudal orientations to the marker image. No physical marker is necessary to orient the x-ray image.

CONCLUSION

In summary, the present invention provides an anatomical marker for x-ray orientation. A method in accordance with the present invention comprises the step of forming a radiopaque marker with a first side indicator and a second side indicator. The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method for orienting a radiological image with a patient's anatomical position, comprising:
    forming a marker with a first side indicator comprising a left symbol and a second side indicator comprising a right symbol, where the first side indicator and the second side indicator are concurrently present;
    where a cranial indicator is formed on the marker, the cranial indicator comprising a humanoid head shape;
    aligning the cranial indicator toward the patient's head;
    placing the marker in left-right orientation such that the left symbol matches a left side of a patient's anatomical position and the right symbol matches a right side of the patient's anatomical position; and
    adjusting a fluoroscopy x-ray image by rotating, reversing, shifting, or zooming such that a cranio-caudal line is substantially vertical and the x-ray image is in antero-posterior position.

2. The method of claim 1, wherein the second side indicator is formed substantially opposite the first side indicator.

3. The method of claim 2, wherein the first side indicator, the second side indicator, and the cranial indicator are non-transparent and radiopaque.

4. The method of claim 1, wherein an anterior indicator is formed on the marker and where the anterior indicator is radiolucent.

5. The method of claim 4, wherein a posterior indicator is formed on the marker and where the posterior indicator is radiolucent.

6. The method of claim 5, wherein a caudal indicator is formed on the marker and where the caudal indicator is radiopaque.

7. The method of claim 6, wherein the marker is placed substantially near an x-ray-sensitive medium.

8. The method of claim 6, wherein the marker comprises a humanoid shape.

9. The method of claim 6, where the marker further comprises a plurality of hash marks about a circular periphery.

10. A marker for orienting a radiological image with a patient's body position, comprising:
a first side indicator and a cranial indicator formed adjacent to the first side indicator, where the cranial indicator comprises a humanoid head shape, where the first side indicator and the cranial indicator are metal and radiopaque, where the first side indicator comprises a first symbolic mark indicating right or left, and where the marker is formed in humanoid shape;
a second side indicator formed substantially opposite the first side indicator and where the second side indicator comprises a second symbolic mark indicating an opposite side from the first side indicator;
a caudal indicator formed substantially opposite the cranial indicator and where the caudal indicator is metal and radiopaque;
a posterior indicator formed substantially opposite the anterior indicator, where the posterior indicator is formed on a posterior side of the marker;
an anterior indicator formed on an anterior side of the marker;
and
a torso between the cranial indicator and the caudal indicator, where the torso is metal and radiopaque.

11. The marker of claim 10, further comprising a first arm where the first arm extends from the torso and where the first arm is metal and radiopaque.

12. The marker of claim 11, where the first side indicator is adjacent to the first arm.

13. The marker of claim 10, further comprising a second arm where the second arm extends from the torso and where the second arm is metal and radiopaque.

14. The marker of claim 13, where the second side indicator is adjacent to the second arm.

15. The marker of claim 10, where the first side indicator is substantially circumscribed in a first hand formed at the distal end of the first arm and where the first hand is metal and radiopaque.

16. The marker of claim 10, where the marker further comprises an outline shape of a humanoid and where the outline shape is metal and radiopaque.

17. The marker of claim 13, where the first arm and the second arm are formed by a single line.

18. The marker of claim 10, where the marker further comprises a sticker on an at least one side of the marker, and where the sticker comprises an adhesive layer.

19. The marker of claim 10, where the anterior indicator is radiolucent and where the posterior indicator is radiolucent.

20. The marker of claim 10, where a non-transparent layer lies between the anterior indicator and the posterior indicator such that the non-transparent layer substantially obscures the anterior indicator and the posterior indicator from simultaneous view.

21. The marker of claim 10, where the marker further comprises a circular periphery having a plurality of radiopaque hash marks radiating from the center of the circular periphery.

22. The marker of claim 10, where the marker further comprises a patient symbol, and where the patient symbol is adjacent to the first side indicator.

23. The marker of claim 10, where the anterior indicator forms a humanoid face.

24. The marker of claim 10, where the posterior indicator comprises a back of a humanoid head.

25. The marker of claim 10, where the caudal indicator comprises a pair of legs.

26. The market of claim 10, where the first side indicator comprises an at least one color: blue or red.

27. A marker for orienting a radiological image with a patient's body position, comprising:
a first side indicator and a cranial indicator formed adjacent to the first side indicator, where the cranial indicator comprises a humanoid head shape, where the first side indicator and the cranial indicator are metal and radiopaque, where the first side indicator comprises a first symbolic mark indicating right or left, and where the marker is formed in humanoid shape;
a second side indicator formed substantially opposite the first side indicator and where the second side indicator comprises a second symbolic mark indicating an opposite side from the first side indicator;
a caudal indicator formed substantially opposite the cranial indicator and where the caudal indicator is metal and radiopaque;
a posterior indicator formed substantially opposite the anterior indicator, where the posterior indicator is formed on a posterior side of the marker;
an anterior indicator formed on an anterior side of the marker;
and
where the marker is embedded in a radiolucent material.

28. The marker of claim 27, where the radiolucent material is transparent.

29. The marker of claim 27, where the marker further comprises an acceptor to which a nipple can be rotatably affixed, and where the nipple is formed on a sticker.

30. The marker of claim 27, further comprising a clip attached to the radiolucent material.

31. The marker of claim 27, further comprising a belt with the marker non-rotatably placed upon the belt.

32. The marker of claim 27, further comprising a pocket on the belt, where the marker is removable from the pocket.

33. The marker of claim 27, further comprising a weighted portion substantially near an at least one end of the belt.

34. The marker of claim 27, where the belt is substantially within a bag.

35. A marker for orienting a radiological image with a patient's anatomical position, comprising:
a torso which is metal and radiopaque;
a first side indicator formed adjacent to the torso;
a second side indicator formed substantially opposite the first side indicator and
adjacent to the torso; and
an anterior indicator which is radiolucent.

36. The marker of claim 35, further comprising a cranial indicator formed adjacent to the torso, where the cranial indicator is metal and radiopaque.

37. The marker of claim 36, where the cranial indicator comprises an arrow shape.

38. A method for orienting an x-ray image, comprising displaying a humanoid-shaped marker image in a digital x-ray image where the humanoid-shaped marker image comprises a solid torso and a first side indicator and where the digital x-ray concurrently displays a patient's bony landmark.

39. The method of claim 38, further comprising adjusting the digital x-ray image to align left-right and cranio-caudal orientations to the humanoid-shaped marker image, where the digital x-ray image is a live fluoroscopy image.

40. The method of claim 39, where no physical marker is used to orient the x-ray image.

41. A method comprising:
displaying an x-ray image in video fluoroscopy, where the x-ray image comprises an at least one patient's bony landmark, where the at least one patient's bony landmark is shown simultaneously with a humanoid-shaped radiopaque marker image, the radiopaque marker comprising:
a first side indicator comprising a left symbolic mark,
a second side indicator comprising a right symbolic mark,
a cranial indicator which is metal and radiopaque, where the cranial indicator is humanoid head-shaped, and
a solid torso which is metal and radiopaque.

42. The method of claim 41, further comprising: rotating the x-ray image such that the radiopaque marker image is substantially vertical.

43. The method of claim 41, further comprising: reversing the x-ray image, such that the x-ray image is substantially in an antero-posterior position.

44. The method of claim 41, further comprising: shifting the x-ray image, such that the x-ray image comprises the at least one patient's bony landmark and the radiopaque marker image.

45. The method of claim 41, further comprising: zooming the x-ray image such that the x-ray image comprises the at least one patient's bony landmark and the radiopaque marker image.

46. A marker for orienting a radiological image with a patient's body position, comprising:
a first side indicator;
a cranial indicator formed adjacent to the first side indicator;
a second side indicator formed substantially opposite the first side indicator;
a marker formed in humanoid shape;
a caudal indicator formed substantially opposite the cranial indicator;
an anterior indicator formed on an anterior side of the marker;
a posterior indicator formed substantially opposite the anterior indicator, where the posterior indicator is formed on a posterior side of the marker;
a torso between the cranial indicator and the caudal indicator;
a first arm where the first arm extends from the torso;
a second arm where the second arm extends from the torso;
where the first side indicator is adjacent to the first arm;
where the first side indicator is substantially circumscribed in a first hand formed at the distal end of the first arm;
where the marker further comprises an outline shape of a humanoid;
where the first arm and the second arm are formed by a single line;
where the second side indicator is adjacent to the second arm;
where the anterior indicator is radiolucent; and
where the posterior indicator is radiolucent.

47. The market of claim 46, further comprising a left side indicator comprising a color blue and a right side indicator comprising a color red.

* * * * *